(12) United States Patent
Taguchi

(10) Patent No.: US 7,170,723 B2
(45) Date of Patent: Jan. 30, 2007

(54) MAGNETIC DISK APPARATUS USING MAGNETIC HEAD HAVING MAGNETORESISTIVE FILM

(75) Inventor: Tomoko Taguchi, Kunitachi (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 764 days.

(21) Appl. No.: 10/349,211

(22) Filed: Jan. 23, 2003

(65) Prior Publication Data

US 2003/0184922 A1 Oct. 2, 2003

(30) Foreign Application Priority Data

Mar. 29, 2002 (JP) ............................. 2002-097647

(51) Int. Cl.
*G11B 5/33* (2006.01)

(52) U.S. Cl. .................................................. 360/324.1

(58) Field of Classification Search ............. 360/324.1, 360/324.11, 324.12; 428/329, 694
See application file for complete search history.

(56) References Cited

U.S. PATENT DOCUMENTS

| 6,198,610 | B1 * | 3/2001 | Kawawake et al. .... 360/324.12 |
| 6,372,338 | B1 * | 4/2002 | Jeffers et al. ............... 428/329 |
| 6,456,448 | B1 * | 9/2002 | Akagi et al. ................... 360/55 |
| 6,509,111 | B1 * | 1/2003 | Shoda et al. ............. 428/694 T |
| 2002/0089771 | A1 * | 7/2002 | Akagi et al. ................... 360/55 |
| 2004/0023073 | A1 * | 2/2004 | Shimizu et al. ..... 428/694 MM |
| 2004/0053073 | A1 * | 3/2004 | Lu et al. .................. 428/694 T |

FOREIGN PATENT DOCUMENTS

JP 2000-339636 12/2000

* cited by examiner

*Primary Examiner*—Hoa Nguyen
*Assistant Examiner*—Mark Blouin
(74) *Attorney, Agent, or Firm*—Pillsbury Winthrop Shaw Pittman, LLP

(57) ABSTRACT

A magnetic disk apparatus has a magnetic recording medium including a recording layer formed on a nonmagnetic substrate, and a magnetic head including a magnetoresistive film arranged above the magnetic recording medium and a pair of electrodes formed on both surfaces of the magnetoresistive film along a track direction so as to make a sense current flow in a direction perpendicular to a plane of the magnetoresistive film. The recording layer has an easy axis of magnetization in a direction perpendicular to a track width direction, which is a direction of a magnetic field generated by the flow of the sense current, a ratio $M_A/M_e$ of which recording layer is smaller than 0.6, where $M_A$ is a remanent magnetization in the track width direction and $M_e$ is a remanent magnetization in the direction of the easy axis of magnetization.

5 Claims, 5 Drawing Sheets

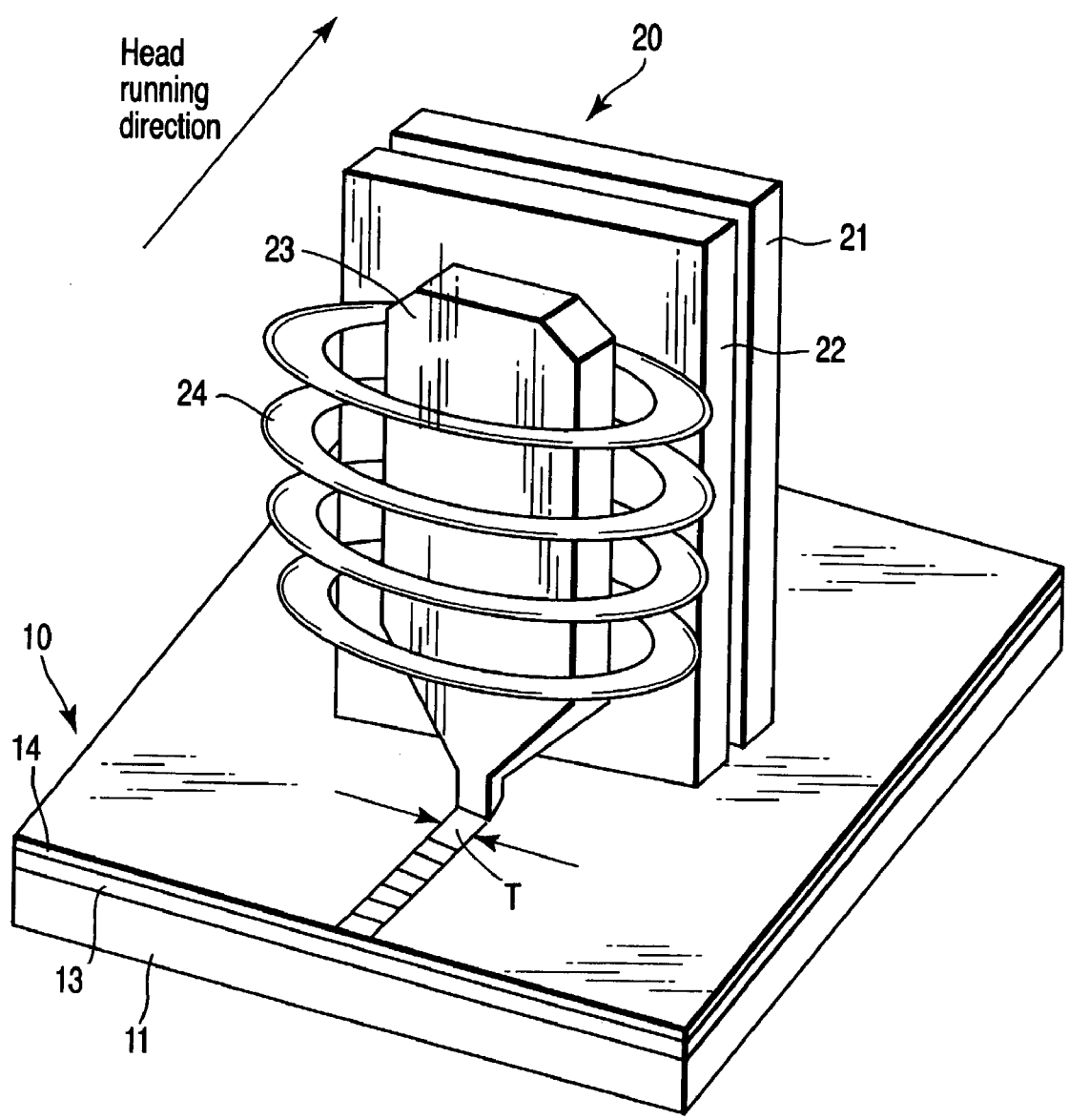
F I G. 1

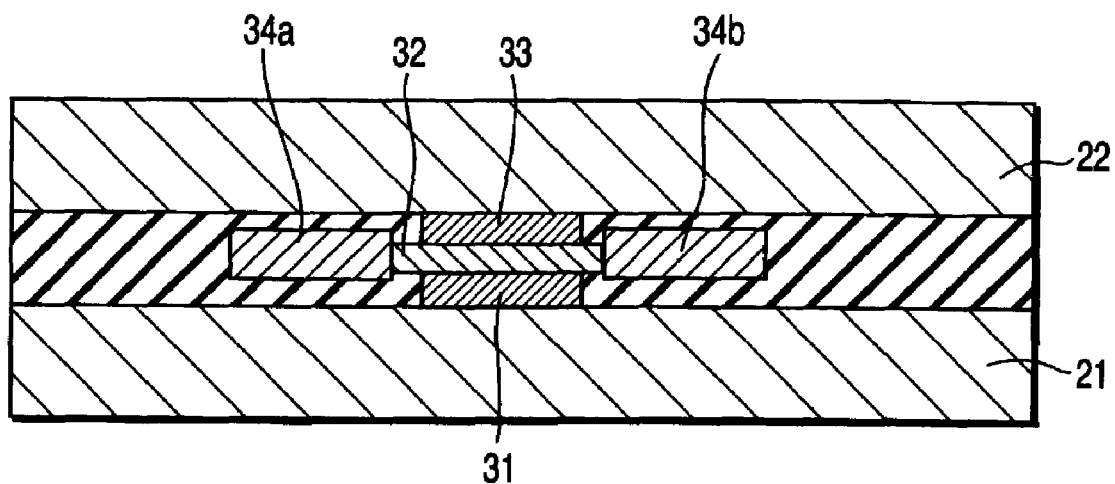
F I G. 2
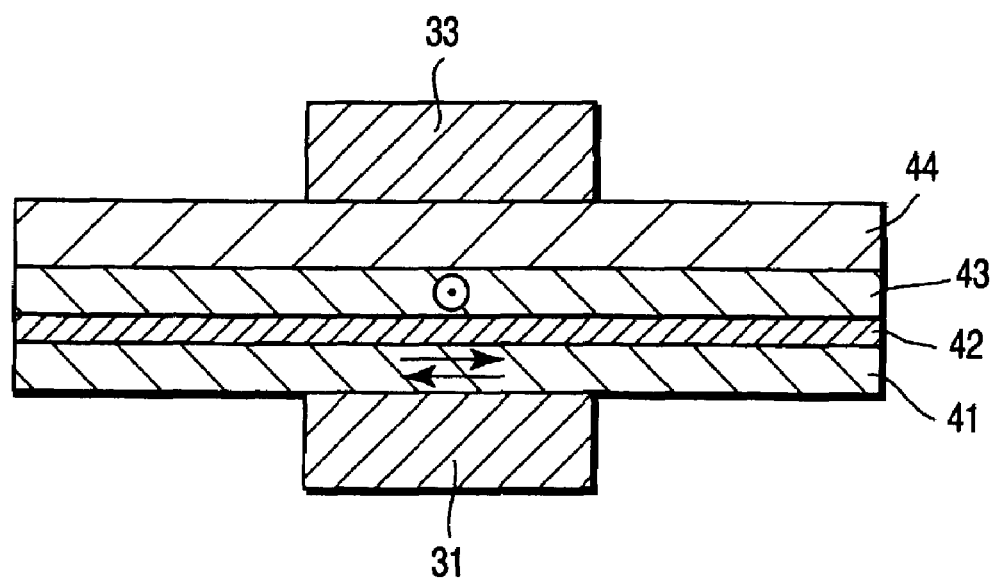
F I G. 3

MAGNETIC DISK APPARATUS USING MAGNETIC HEAD HAVING MAGNETORESISTIVE FILM

CROSS-REFERENCE TO RELATED APPLICATIONS

This application is based upon and claims the benefit of priority from the prior Japanese Patent Application No. 2002-097647, filed Mar. 29, 2002, the entire contents of which are incorporated herein by reference.

BACKGROUND OF THE INVENTION

1. Field of the Invention

The present invention relates to a magnetic disk apparatus using a magnetic head having a magnetoresistive film capable of detecting signals with a high signal-to-noise ratio.

2. Description of the Related Art

In recent years, a magnetic head using a current-perpendicular-to-plane magnetoresistive film (CPP-MR film) or a tunneling magnetoresistive film (TMR film) has attracted attention as a magnetic head capable of coping with the increase in the density of the magnetic disk apparatus. The magnetoresistive film used in the magnetic head noted above is of a stacked structure of shielding layer/electrode layer/magnetization free layer/nonmagnetic layer/magnetization pinned layer/antiferromagnetic layer/electrode layer/shielding layer in which a sense current is made flow in a direction perpendicular to the film plane and along the track direction to detect the recorded magnetization. In the magnetic head, the electrode layers are arranged below and above the magnetoresistive film which makes it possible to reduce the track width and, thus, to cope with the requirement for higher density.

Conventionally, a magnetic disk apparatus using a magnetic head having a CPP-MR film or TMR film noted above in combination with a longitudinal recording medium is known. In the longitudinal recording layer used in the prior art, the easy axis of magnetization is directed at random within the plane or is slightly anisotropic.

However, it has been found that, in the case of using a magnetoresistive reproduction head of the construction where a sense current is made flow in a direction perpendicular to the film plane, i.e., along the track direction, a sense current magnetic field is generated in the track width direction so as to give rise to problems. What should be noted is that the sense current magnetic field gives rise to deterioration of recorded information on the longitudinal recording medium, particularly increase in noise and deterioration of recording resolution.

BRIEF SUMMARY OF THE INVENTION

An object of the present invention is to provide a magnetic disk apparatus capable of preventing deterioration of recorded information and also capable of performing magnetic recording and reproduction of a high quality conforming to higher recording density.

According to an aspect of the present invention, there is provided a magnetic disk apparatus, comprising: a magnetic recording medium including a recording layer formed on a nonmagnetic substrate, and a magnetic head including a magnetoresistive film arranged above the magnetic recording medium and a pair of electrodes formed on both surfaces of the magnetoresistive film along a track direction so as to make a sense current flow in a direction perpendicular to a plane of the magnetoresistive film, the recording layer having an easy axis of magnetization in a direction perpendicular to a track width direction, which is a direction of a magnetic field generated by the flow of the sense current, a ratio $M_A/M_e$ of which recording layer is smaller than 0.6, where $M_A$ is a remanent magnetization in the track width direction of the recording layer and $M_e$ is a remanent magnetization in the direction of the easy axis of magnetization of the recording layer.

Additional objects and advantages of the present invention will be set forth in the description which follows, and in part will be obvious from the description, or may be learned by practice of the present invention. The objects and advantages of the present invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the present invention, and together with the general description given above and the detailed description of the preferred embodiments given below, serve to explain the principles of the present invention.

FIG. 1 is a perspective view schematically showing the construction of a magnetic disk apparatus according to an embodiment of the present invention;

FIG. 2 is a cross-sectional view of the reproduction head of the magnetic head shown in FIG. 1 cut along a plane parallel to the air-bearing surface;

FIG. 3 is a cross-sectional view exemplifying the construction of a magnetoresistive film;

DETAILED DESCRIPTION OF THE INVENTION

Figure 4:
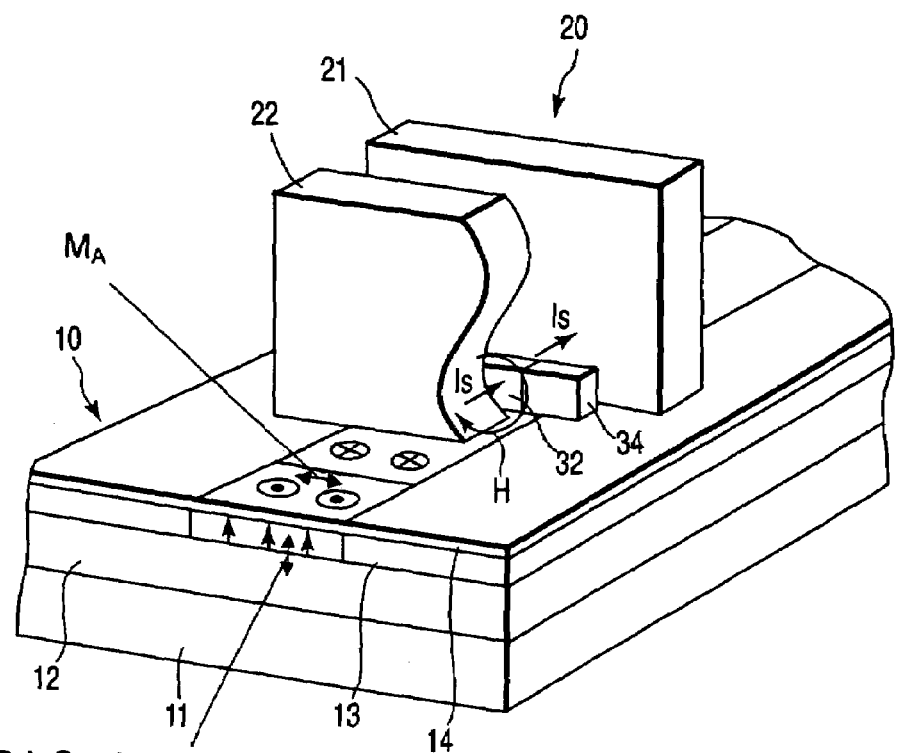
FIG. 4 is a perspective view for describing the operation of the magnetic disk apparatus according to the embodiment of the present invention.

Embodiments of the present invention will now be described with reference to the accompanying drawings.

The present inventor has studied why recorded information deteriorates in a conventional magnetic disk apparatus in which a magnetic head having a CPP-MR film or TMR film is used in combination with a longitudinal recording medium. As a result, it has been found that, if a sense current magnetic field is applied in the track width direction to the magnetization transition, which serves to determine the quality of the recorded information in the longitudinal recording medium, the magnetization transition is disturbed so as to increase noise and to degrade recording resolution. The present invention will now be described by comparing the magnetic disk apparatus of the present invention with the conventional magnetic disk apparatus.

FIG. 1 is a perspective view schematically showing the construction of a magnetic disk apparatus according to an embodiment of the present invention. FIG. 1 shows a magnetic disk 10 and a magnetic head 20, which are mounted on a perpendicular magnetic disk apparatus.

As shown in FIG. 1, the magnetic disk 10 comprises a nonmagnetic substrate 11, a perpendicular recording layer 13 formed on the nonmagnetic substrate 11 and a protective layer 14 formed on the perpendicular recording layer 13. The easy axis of magnetization of the perpendicular recording layer 13 is substantially perpendicular to the film plane. It is possible to form, as required, a soft magnetic backing layer or an underlayer between the nonmagnetic substrate 11 and the perpendicular recording layer 13.

The magnetic head 20 is arranged above the magnetic disk 10. The magnetic head 20 comprises a reproduction head including a lower shield 21, a magnetoresistive film, which is not shown in FIG. 1, and an upper shield 22, and a recording head including a recording magnetic pole 23 and an exciting coil 24 acting on the recording magnetic pole 23. In an integrated magnetic head, the upper shield 22 is magnetically coupled with the recording magnetic pole 23 so as to perform the function of a part of the recording head. In this case, the upper shield 22 acts as a leading pole, and the recording magnetic pole 23 acts as a trailing pole. FIG. 1 shows a recording track having a track width T, which is formed in that portion of the magnetic disk positioned below the recording magnetic pole 23.

FIG. 2 is a cross-sectional view of the reproduction head of the magnetic head cut along a plane parallel to the air-bearing surface (ABS). The reproduction head uses a so-called CPP-MR film (current-perpendicular-to-plane magnetoresistive film) as a magnetoresistive film. As shown in FIG. 2, a lower electrode 31, a magnetoresistive film 32 and an upper electrode 33 are stacked one upon the other in the order mentioned in the track direction between the lower shield 21 and the upper shield 22. The lower electrode 31 is connected to the lower shield 21. The upper electrode 33 is connected to the upper shield 22. Also, the lower shield 21 and the upper shield 22 perform the function of leads for flowing a sense current into the magnetoresistive film 32 where the sense current flows from one shield toward the other shield. A pair of hard bias films 34a, 34b are formed on both sides of the magnetoresistive film 32 in the track width direction. The lower electrode 31, the magnetoresistive film 32, the upper electrode 33 and the hard bias films 34a, 34b are surrounded by an insulating film 35.

FIG. 3 exemplifies the construction of the magnetoresistive film 32. The magnetoresistive film 32 shown in FIG. 3 comprises a magnetization free layer (free layer) 41, a nonmagnetic layer 42 formed of a metal, a magnetization pinned layer (pinned layer) 43, an antiferromagnetic layer 44, which are stacked one upon the other as viewed from the lower electrode 31. It is possible to form an underlayer below the magnetization free layer 41 and a protective layer on the antiferromagnetic layer 44, as required. It is also possible to stacked the magnetization free layer 41, the nonmagnetic layer 42, the magnetization pinned layer 43 and the antiferromagnetic layer 44 in the reverse order to that referred to above.

Incidentally, it is possible to use a TMR film (tunneling magnetoresistive film) including the nonmagnetic layer 42 formed of a dielectric material such as $Al_2O_3$ as the magnetoresistive film 32.

The operation of the magnetic disk apparatus according to the embodiment of the present invention will now be described with reference to FIG. 4. The magnetic disk 10 comprises a nonmagnetic substrate 11, a soft magnetic backing layer 12 formed on the nonmagnetic substrate 11, a perpendicular recording layer 13 formed on the soft magnetic backing layer 12, and a protective film 14 formed on the perpendicular recording layer 13. Recording cells each magnetized upward or downward are formed in the recording track of the magnetic disk 10. The recording layer of the magnetic disk in which perpendicular recording is performed is scarcely magnetized in the track width direction. It should be noted that the ratio of the remanent magnetization $M_A$ in the track width direction of the recording layer to the remanent magnetization $M_e$ in the direction of the easy axis of magnetization of the recording layer is smaller than 0.6. In other words, the magnetic disk apparatus of the present invention satisfies the condition of: $M_A/M_e<0.6$.

For reading out the magnetic recording, a sense current is made flow from, for example, the upper shield 22 toward the lower shield 21 in a direction perpendicular to the plane of the magnetoresistive film 32. During running of the reproduction head, the magnetization of the magnetization free layer included in the magnetoresistive film 32 is rotated in accordance with magnetization of the recording cells. When the direction of the magnetization of the magnetization free layer has become parallel to the direction of the magnetization of the magnetization pinned layer, the resistance of the magnetoresistive film 32 is made low. When the direction of the magnetization of the magnetization free layer has become antiparallel to the direction of the magnetization of the magnetization pinned layer, the resistance of the magnetoresistive film 32 is made high. The change in the resistance is detected as a change in the voltage of the circuit through which the sense current flows.

As shown in FIG. 4, the sense current magnetic field H is directed in the track width direction on the surface of the magnetic recording medium and is perpendicular to the easy axis of magnetization of the recording layer (i.e., direction perpendicular to the film plane). In other words, since the direction of the sense current magnetic field H is coincident with the direction of the hard axis of magnetization of the recording layer 13, the magnetized state of the recording layer 13 is not affected by the sense current magnetic field H and, thus, is maintained stable.

Figure 5:
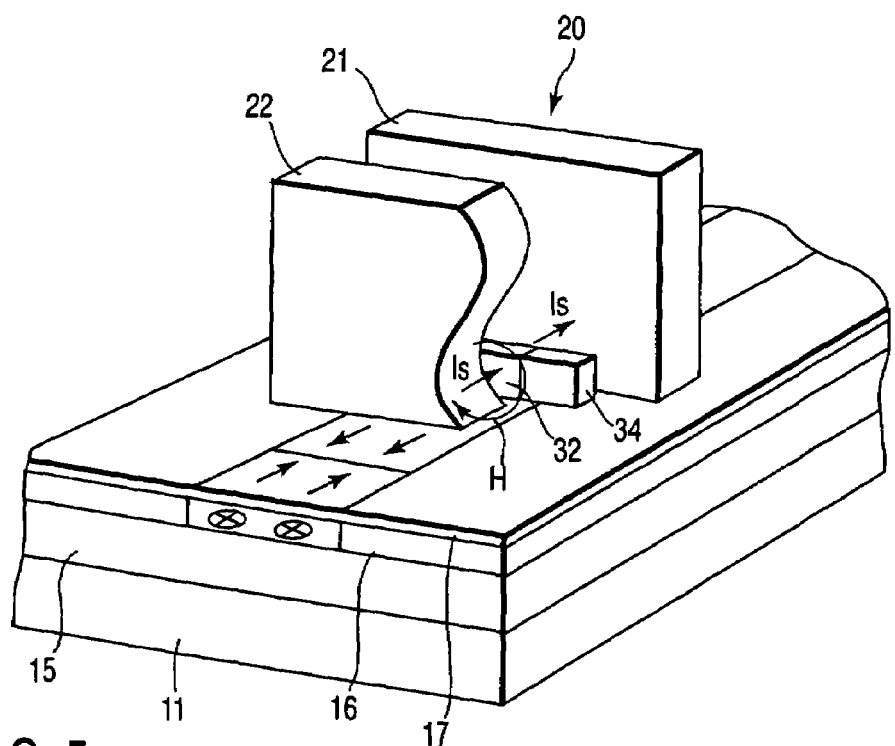
FIG. 5 is a perspective view for describing the operation of a conventional magnetic disk apparatus.

For comparison, the operation of the conventional magnetic disk apparatus in which a reproduction head having a CPP-MR film of a construction equal to that described previously is used in combination with a longitudinal recording medium is described with reference to FIG. 5. The conventional magnetic disk apparatus comprises a magnetic disk 10' including a nonmagnetic substrate 11, an underlayer 15 formed on the nonmagnetic substrate 11, a longitudinal recording layer 16 formed on the underlayer 15, and a protective layer 17 formed on the longitudinal recording layer 16. In the longitudinal recording layer 16, the easy axes of magnetization are directed at random within a plane. Recording cells each magnetized substantially along the track direction are formed in the recording track of the magnetic disk 10'. If a sense current is made flow from the upper shield 22 toward the lower shield 21 in a direction perpendicular to the plane of the magnetoresistive film 32 for reading out the magnetic recording, the sense current magnetic field H is directed in the track width direction on the surface of the magnetic recording medium, as described previously in conjunction with the embodiment of the present invention.

In the magnetization transitions of the longitudinal recording layer 16, the magnetization directions are opposite to those of the neighboring recording cells and, thus, magnetization components that are not directed in the track direction are locally present within the magnetization transitions. Note that signal processing is performed on the basis of the detected signals from the magnetization transitions. If a sense current magnetic field H is applied to the unstable magnetization transitions in the track width direction, the local magnetization in the magnetization transitions tend to be directed in the track width direction. As a result, the sharp change in the magnetization transition is weakened so as to increase the noise and, thus, to degrade the signal. Also, the width of the magnetization transition is broadened over a long time so as to lower the resolution.

Figure 6A:
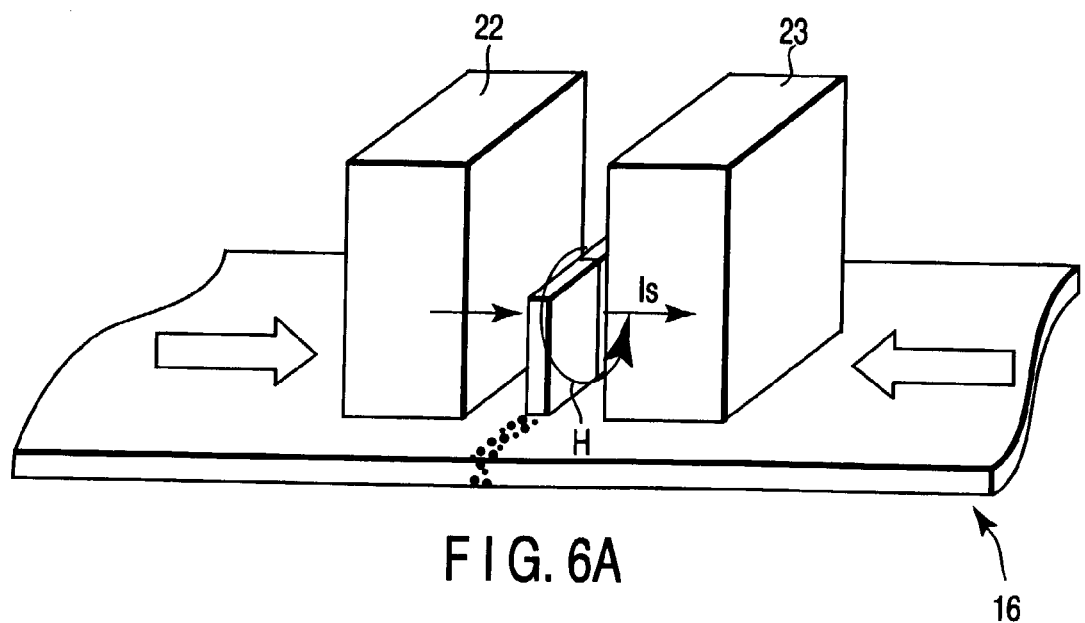
FIG. 6A is a perspective view for describing the sense current magnetic field applied to a magnetization transition of a longitudinal recording layer.
Figure 6B:
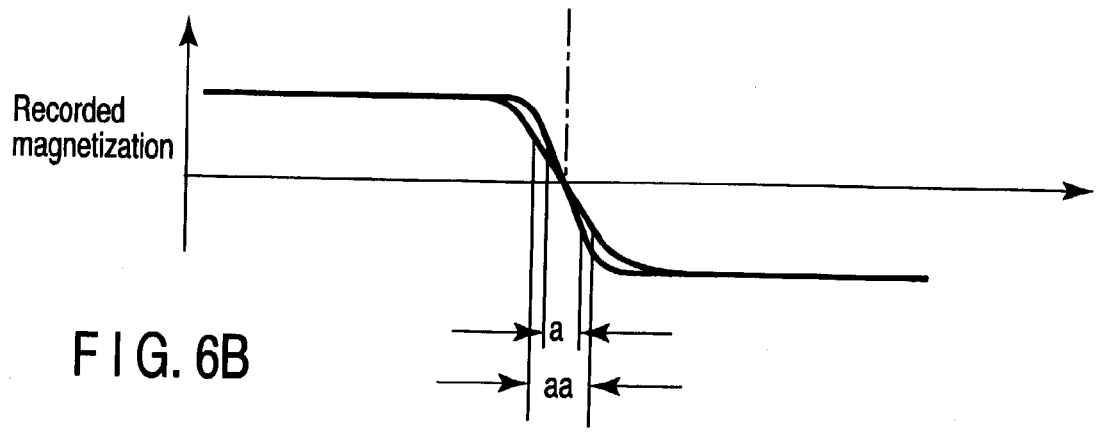
FIG. 6B is a graph showing magnetization transition widths immediately after recording and after recording and repetition of reproduction in the longitudinal recording layer.

The influences produced by the sense current magnetic field applied to a magnetization transition of the longitudinal recording layer will now be described with reference to FIGS. 6A and 6B. FIG. 6A shows the state that the magnetoresistive film is positioned right above the magnetization transition and that a sense current magnetic field H is applied from the magnetoresistive film to the magnetization transition in the track width direction. FIG. 6B shows that the magnetization transition width "a" immediately after the recording is broadened to a magnetization transition width "aa" after repetition of the reproduction. This phenomenon leads to deterioration of the resolution.

Figure 7:
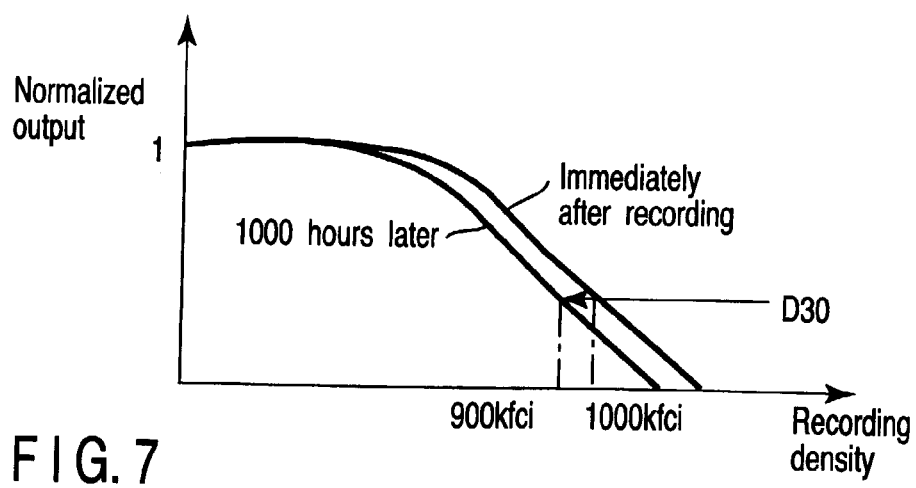
FIG. 7 is a graph showing the relationship between the recording density and the reproduction output in respect of a longitudinal recording medium, covering the cases where the reproduction was performed immediately after the recording and where the reproduction was performed after 1000 hours of a continuous reproduction.

FIG. 7 is a graph showing the relationship between the recording density and the reproduction output in respect of a longitudinal recording medium, covering the cases where the reproduction is performed immediately after the recording and where the reproduction is performed after continuous reproduction for 1000 hours (i.e., after the sense current magnetic field H was kept applied in the track width direction). In FIG. 7, the recording density $D_{30}$ that permits obtaining an output in an amount of 30% of the output obtained by the low recording density is compared. As shown in FIG. 7, the value of $D_{30}$, which was 1000 kfci immediately after the recording, was deteriorated by 10% to 900 kfci 1000 hours later. In this fashion, the resolution is markedly degraded in the longitudinal recording medium.

Figure 8:
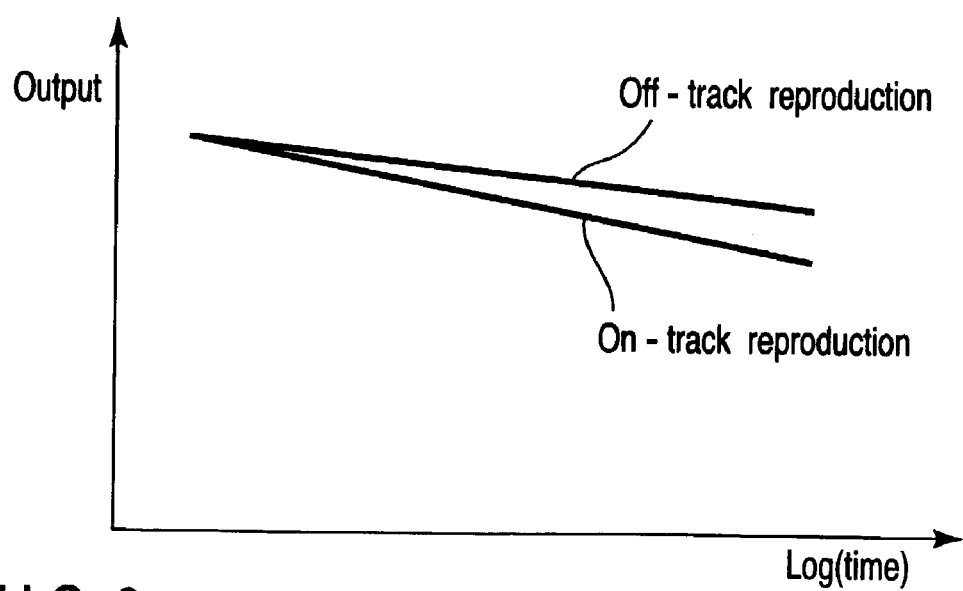
FIG. 8 is graph showing the change with time in the output in a longitudinal recording medium.
Figure 9:
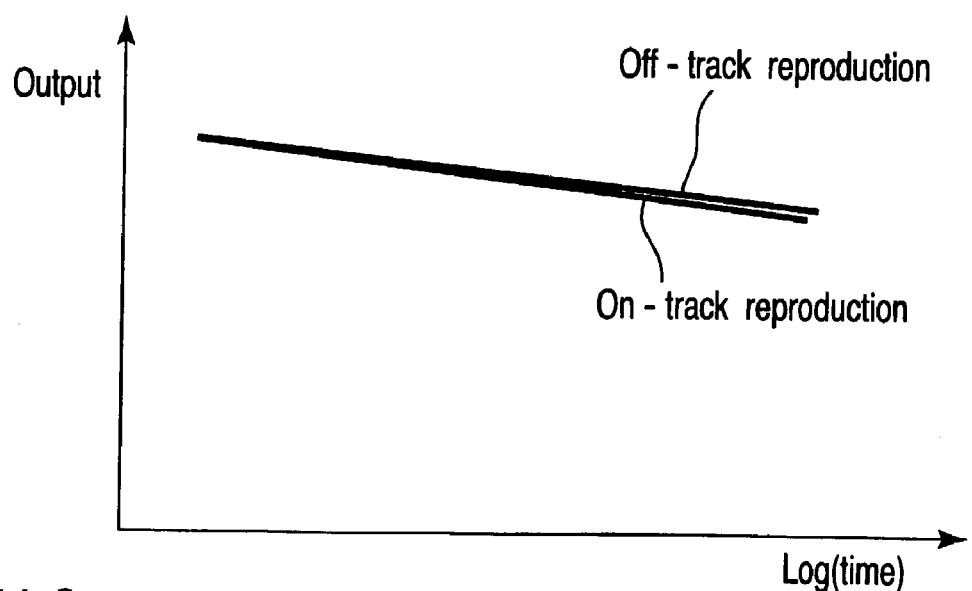
FIG. 9 is graph showing the change with time in the output in a perpendicular recording medium.

The longitudinal recording medium and the perpendicular recording medium will now be compared with each other in respect of the change with time in the output with reference to FIGS. 8 and 9. FIG. 8 is a graph showing the change with time in the output for the longitudinal recording medium. FIG. 9 is a graph showing the change with time in the output for the perpendicular recording medium. In this case, measurements were made of the output reproduced from a recording track after the reproduction head was deviated from the recording track and allowed to run for a prescribed time (under an off-track state) and the output reproduced from a recording track after the reproduction head was allowed to run for the prescribed time on the recording track (under the on-track state) in each of the longitudinal recording medium and the perpendicular recording medium so as to examine the change with time in the output.

As shown in FIGS. 8 and 9, each of the longitudinal recording medium and the perpendicular recording medium exhibits a similar tendency in the decrease with time in the output after the off-track reproduction. The decreasing tendency of the output is derived from the thermal fluctuation. However, the longitudinal recording medium exhibits a marked reduction with time in the output after the on-track reproduction, as shown in FIG. 8. On the other hand, in the perpendicular recording medium, the output after the on-track reproduction is substantially equal to the output after the off-track reproduction, though the deterioration caused by the thermal fluctuation alone is recognized, as shown in FIG. 9. In other words, even if the sense current magnetic field H is applied from the magnetoresistive film in the track width direction, the recorded state scarcely deteriorates in the perpendicular recording medium.

Incidentally, an effect similar to that described above can be obtained even from the longitudinal recording medium as far as the recording medium has magnetic anisotropy in the track direction and the ratio $M_A/M_e$ of the remanent magnetization $M_A$ in the track width direction of the recording layer to the remanent magnetization $M_e$ in the direction of the easy axis of magnetization of the recording layer is smaller than 0.6, i.e., $M_A/M_e < 0.6$.

Additional advantages and modifications will readily occur to those skilled in the art. Therefore, the present invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A magnetic disk apparatus, comprising: a magnetic recording medium including a recording layer formed on a nonmagnetic substrate, and a magnetic head including a magnetoresistive film arranged above the magnetic recording medium and a pair of electrodes formed on both surfaces of the magnetoresistive film along a track direction so as to make a sense current flow in a direction perpendicular to a plane of the magnetoresistive film, the recording layer having an easy axis of magnetization in a direction perpendicular to a track width direction, which is a direction of a magnetic field generated by the flow of the sense current, a ratio $M_A/M_e$ of which recording layer is smaller than 0.6, where $M_A$ is a remanent magnetization in the track width direction of the recording layer and $M_e$ is a remanent magnetization in the direction of the easy axis of magnetization of the recording layer.

2. A magnetic disk apparatus according to claim 1, wherein the magnetic recording medium is a perpendicular magnetic recording medium.

3. A magnetic disk apparatus according to claim 1, wherein the magnetic recording medium is a longitudinal recording medium having magnetic anisotropy in the track direction.

4. A magnetic disk apparatus according to claim 1, wherein the magnetoresistive film has a stacked structure of a magnetization free layer, a nonmagnetic layer formed of a metal, a magnetization pinned layer, and an antiferromagnetic layer.

5. A magnetic disk apparatus according to claim 1, wherein the magnetoresistive film has a stacked structure of a magnetization free layer, a nonmagnetic layer formed of a dielectric material, a magnetization pinned layer, and an antiferromagnetic layer.

* * * * *